United States Patent Office.

JOSEPH A. VEAZIE, OF BOSTON, MASSACHUSETTS.

Letters Patent No. 74,260, dated February 11, 1868.

---

IMPROVEMENT IN REMOVING INK AND COLORS FROM PRINTED PAPER.

---

*The Schedule referred to in these Letters Patent and making part of the same.*

---

TO ALL WHOM IT MAY CONCERN:

Be it known that I, JOSEPH A. VEAZIE, of Boston, in the county of Suffolk, and State of Massachusetts, have invented an Improved Process for Removing Ink and Colors from Printed Paper, and dirt from rags and other paper-stock; and I do hereby declare that the following is a full, clear, and exact description thereof.

My invention consists in an improved process for extracting ink and colors from printed paper, which operation at the same time reduces it to a pulp suitable for use in the manufacture of white paper, this process being also applicable for cleansing rags and other paper-stock.

To enable others skilled in the art to understand and use my invention, I will proceed to describe the manner in which I have carried it out.

A saponaceous composition is first made by dissolving twelve pounds of potash, or an equivalent of other fixed alkali, in sufficient boiling water. To this add fourteen pounds of rendered tallow, or an equivalent of other fats or oils. Boil this mixture three hours; then pour it into a suitable vessel, and add, while cooling, twenty-five gallons of soft water, the water to be added gradually and the mass constantly stirred until cool, in which state it is of a brownish color, and of the consistency of a stiff jelly.

The above proportions may be slightly varied without departing from the spirit of my invention.

The printed or colored paper to be cleansed is placed in an open or closed vessel, with sufficient soft water to cover it and allow of its being freely worked. When the mass has boiled thirty minutes, and is boiling, add, for every hundred gallons of water, five gallons of the saponaceous composition above described, stirring and beating the paper as much as possible, so as to reduce it to pulp. The ink and coloring-matter will soon begin to rise in a scum at the top of the water, which should be allowed to flow off through a spout or faucet fixed for the purpose. As soon as the ink or coloring-matter ceases to rise the water must be drawn off from near the bottom of the vessel, clean boiling water being at the same time allowed to enter at the top, the passage of the water through the pulp serving to thoroughly rinse it. After boiling and stirring for a few minutes the pulp may be removed, when it will be found in a clean and white state, suitable to be again used in the manufacture of white paper. In all cases the pulp should be finally beaten and washed in clean water.

The above-described process may be used to advantage for removing dirt from rags and other paper-stock.

I am aware that a patent was issued to Benjamin Lambert on the 23d day of July, 1861, for an improvement in the treatment of printed paper to remove the ink and recover the pulp, and am familiar with the process described in said patent. In Lambert's process the paper is boiled in a solution of caustic alkali and then cooled, after which the alkaline liquor is removed, a fresh supply added, and the whole again boiled. The paper is then beaten into a pulp, after which the liquor is withdrawn and the pulp thoroughly washed with water.

The several operations above described consume considerable time, while the caustic alkali used alone, even in a weak solution, has a prejudicial effect upon paper-pulp or stock by injuring the fibre, but by combining the caustic alkali with tallow, or its equivalent, so as to form a saponaceous composition according to my invention, as above described, the ink or color is more readily softened and freed from the paper, while a great saving of time and labor is effected, as but one operation is necessary, which may be performed in a very short time.

My improved saponaceous composition does not injure the stock while it is being boiled, has no deleterious effect upon the workmen, and after being used is worth its original cost as a fertilizer.

*Claim.*

What I claim as my invention, and desire to secure by Letters Patent, is—

The within-described saponaceous composition for removing ink or colors from printed paper, and dirt from rags, &c., without injury to the pulp, so that the same can be used repeatedly for the manufacture of white paper, substantially as described.

JOSEPH A. VEAZIE.

Witnesses:
SAMUEL COLBURN,
W. J. CAMBRIDGE.